United States Patent
Yu et al.

(10) Patent No.: US 9,020,721 B2
(45) Date of Patent: Apr. 28, 2015

(54) REAL TIME MODELING OF ENGINE LOAD ADDITION DUE TO ALTERNATOR WITH AN OVER-RUN CLUTCH

(71) Applicants: Songping Yu, Troy, MI (US); Abdul Alkeilani, Bloomfield Hills, MI (US); Anwar Alkeilani, Auburn Hills, MI (US)

(72) Inventors: Songping Yu, Troy, MI (US); Abdul Alkeilani, Bloomfield Hills, MI (US); Anwar Alkeilani, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 78 days.

(21) Appl. No.: 13/693,150

(22) Filed: Dec. 4, 2012

(65) Prior Publication Data

US 2014/0156156 A1    Jun. 5, 2014

(51) Int. Cl.
*F16D 48/06* (2006.01)
*F02N 11/08* (2006.01)
*F04B 35/04* (2006.01)
*F04B 35/00* (2006.01)

(52) U.S. Cl.
CPC ...................................... *F16D 48/06* (2013.01)

(58) Field of Classification Search
USPC .......................... 701/67; 290/31; 417/364, 411
See application file for complete search history.

(56) References Cited

U.S. PATENT DOCUMENTS

| | | | |
|---|---|---|---|
| 4,116,314 A | 9/1978 | Ackerman | |
| 5,383,542 A | 1/1995 | Stockton | |
| 6,226,585 B1 | 5/2001 | Cullen | |
| 7,748,261 B2 | 7/2010 | Sakayanagi | |
| 2003/0102672 A1* | 6/2003 | King et al. | 290/1 A |
| 2005/0068558 A1 | 3/2005 | Wang et al. | |
| 2010/0023292 A1 | 1/2010 | Willard et al. | |
| 2012/0169050 A1* | 7/2012 | Daum et al. | 290/31 |

* cited by examiner

*Primary Examiner* — Fadey Jabr
*Assistant Examiner* — Yazan A Soofi
(74) *Attorney, Agent, or Firm* — Ralph E Smith

(57) ABSTRACT

A system and method for providing engine torque load in real time. The system includes a sensor to determine, in real time, a clutch state of an alternator clutch and a controller for determining an alternator torque value and applying the alternator torque value to the engine torque load in real time.

15 Claims, 3 Drawing Sheets

REAL TIME MODELING OF ENGINE LOAD ADDITION DUE TO ALTERNATOR WITH AN OVER-RUN CLUTCH

FIELD

The present disclosure relates generally to the engine torque load in a vehicle and, more specifically, to a system and method of modeling, in real time, an engine load addition due to an alternator with an over-run clutch.

BACKGROUND

The alternator in a motor vehicle generates electricity. It charges the battery and powers the electrical items of the vehicle when the engine is running. Alternators are typically in most types of vehicles, including cars, trucks, motorcycles, and any other vehicles with engines. The alternator is characterized as an "engine accessory load" because it is driven by the engine, thus creating an added strain on the engine's operation. Alternators typically add a moderate accessory load, but the load may be higher with computer controlled cars, which are increasingly common today.

Other accessory loads include components that are connected to the fan belt, accessory belt or serpentine belt. Besides the alternator, these components often include the power steering pump, water pump, air conditioning compressor, and cooling fan. These components take power from the engine when they are running, and most of them are always running when the engine is running. Along with the torque needed by the engine for driving, it is preferable to account for the torque from these accessory load components when determining the engine torque.

Existing systems that account for alternator torque either set the alternator torque to a fixed value, and do not alter it during operation, leading to incorrect engine torque estimations, or approximate alternator torque using a calibration surface, such as a predetermined chart with alternator rotating speed and duty cycle as inputs.

Unfortunately, estimating errors in these types of systems frequently occur because the engine torque is not updated in real time. Therefore, there exists a need for a system that solves or at least alleviates some or all of these problems.

BRIEF SUMMARY OF THE INVENTION

In one form, the present disclosure provides a system for providing, in real time, an engine torque load to an engine, said system comprising a sensor that determines, in real time, a clutch state of an alternator clutch; and a controller adapted to calculate an alternator torque value; and apply the alternator torque value to the engine torque load in real time.

In some embodiments, the controller determines that an alternator load is disengaged from the engine when an alternator rotor speed is greater than an engine rotation speed. In another embodiment, the alternator clutch is an over-run clutch. In yet another embodiment, a first portion of the over-run clutch is coupled to an alternator, and a second portion of the over-run clutch is coupled to the engine.

In some embodiments the system further comprises a sensor to detect a speed of the engine, wherein the clutch state of the alternator clutch is determined in real time based on the speed of the engine. In some embodiments the system further comprises a sensor to detect the speed of the alternator.

In another embodiments, determining an amount of alternator torque further comprises estimating an alternator rotor speed when the engine revolutions per minute decreases. In yet another embodiment, the alternator rotor speed is estimated by assuming that the engine is decoupled from the alternator. In another embodiment, the alternator torque value is based at least in part on an alternator inertia.

In one form, the present disclosure provides, a method of updating an engine torque load for a vehicle, said method comprising determining by a sensor a clutch state of an alternator clutch; determining by an engine control unit an alternator torque value; and applying by an engine control unit the alternator torque value to the engine torque load when it is determined that the clutch state corresponds to an alternator clutch engaged state.

In another embodiment, the method further comprises determining that an alternator load is disengaged from the engine when an alternator rotor speed is greater than an engine rotation speed. In yet another embodiment, the method further comprises detecting a speed of the engine, wherein the clutch state of the alternator clutch is determined in real time based on the speed of the engine. In another embodiment, the method further comprises detecting the speed of the alternator.

In another embodiment, determining an amount of alternator torque comprises estimating an alternator rotor speed when the engine revolutions per minute decreases. In yet another embodiment, the alternator rotor speed is estimated by assuming that the engine is decoupled from the alternator. In another embodiment, the alternator torque value is based at least in part on an alternator inertia.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the present disclosure, its application or use. Thus, variations that do not depart from the gist of the present disclosure are intended to be within the scope of the present disclosure.

DETAILED DESCRIPTION OF THE INVENTION

According to the principles disclosed herein, and as discussed below, the present disclosure provides systems and methods to model an engine load addition due to an alternator with an over-run clutch. When striving to improve the performance and operational efficiency of the powertrain of a vehicle, the accurate estimation of engine torque becomes increasingly important. The alternator, as an engine accessory, is a key component of this estimate, and alternator torque modeling is an integral part of the engine torque equation. Generally, alternator torque is approximated by a calibration surface with both alternator rotating speed and alternator control duty cycle as inputs, modified by ambient temperature. With an over-run clutch, alternator torque, modeled as described above in existing methods, is not asserted to the engine all of the time. The actual engine load change due to alternator engagement needs to be dynamically determined based on the engine's operation conditions. The systems and methods presented herein are ways to model this interaction in real time.

In today's estimation techniques, the alternator load is constantly added as part of the engine accessory load. With an over-run clutch, widely used to improve vehicle noise, vibration, and harshness (NVH), the alternator may be disengaged from the engine when the deceleration rate of the engine speed is large; this results in a large engine torque estimation error and poor powertrain interactions. The system and method disclosed herein take into account alternator dynamics and determine the clutch states in real time. Once the clutch state is determined, the corresponding amount of alternator torque can be correctly applied as an engine load. In addition, the system and method disclosed herein include the effects of alternator inertia as part of the alternator torque equation, which further improves the engine torque estimation. This improvement in engine torque estimation correspondingly improves vehicle drivability and performance.

Figure 1:
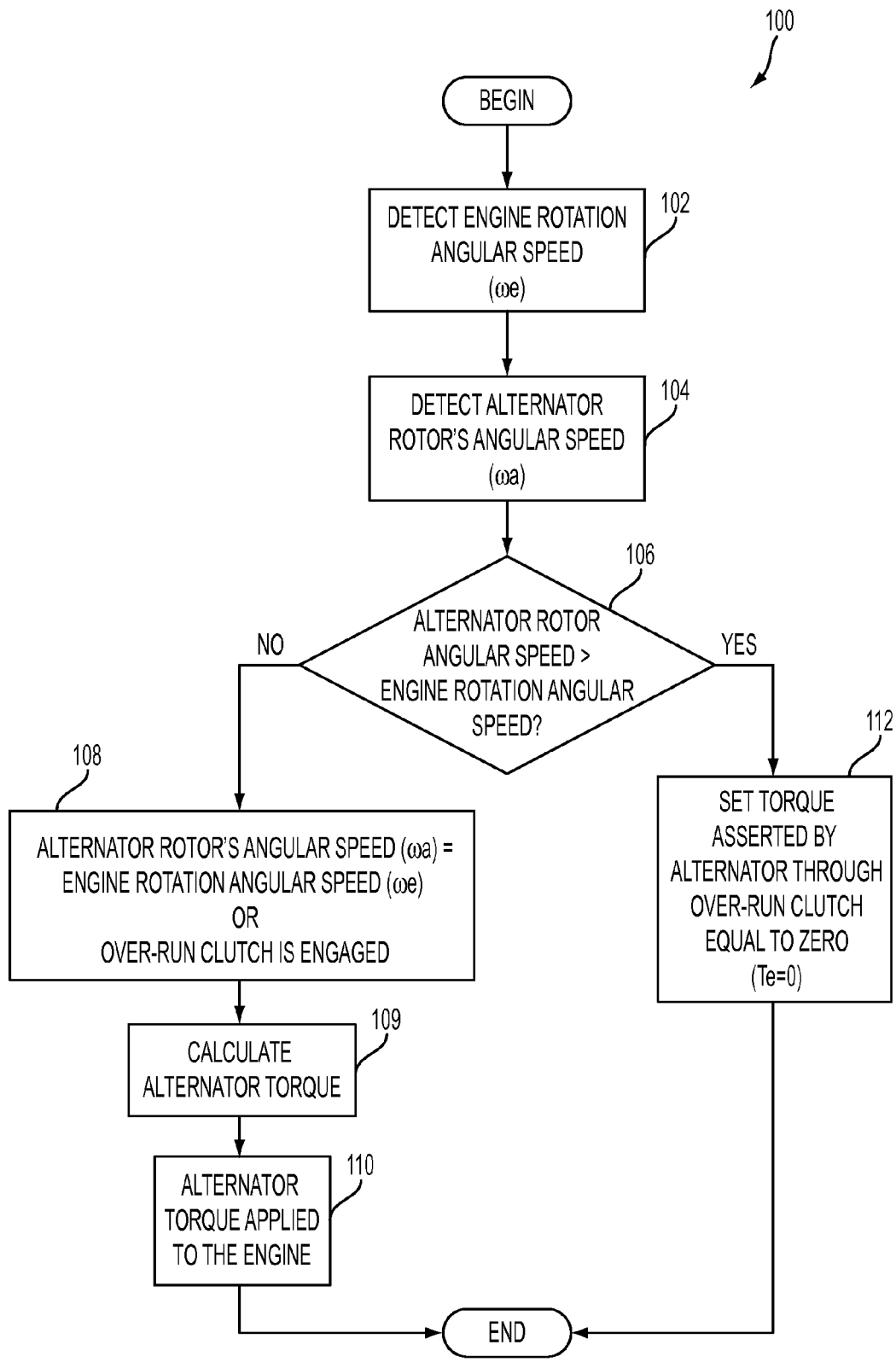
FIG. 1 illustrates a flowchart of a method for providing engine torque load in real time and in accordance with the disclosed principles.

FIG. 1 illustrates a flowchart of a method 100 for providing engine torque load in real time. In a desired embodiment, the method 100 is implemented in software, stored in a computer readable medium, which could be a random access memory (RAM) device, non-volatile random access memory (NVRAM) device, or a read-only memory (ROM) device) and executed by the engine control unit 208 (FIG. 2) or other suitable controller within the system 200 of FIG. 2. It should be noted that the computer readable medium can be part of the engine control unit (ECU).

The process of the system begins at step 102, where the system detects engine rotation angular speed ($\omega e$). At step 104, the system detects the alternator rotor's angular speed ($\omega a$). These detecting steps 102, 104 may occur in any order or at the same time. At step 106, it is determined whether the alternator rotor angular speed is greater than the engine rotation angular speed. If it is determined that the alternator rotor angular speed is greater than the engine rotation angular speed (i.e., the answer at step 106 is yes), the process proceeds to step 112, where the torque asserted by the alternator through the over-run clutch (Te) is set to zero (Te=0). If, however, it is determined that the alternator rotor angular speed is not greater than the engine rotation angular speed (i.e., the answer at step 106 is no), the process proceeds to step 108, where the alternator rotor's angular speed ($\omega a$) is set equal to the engine rotation angular speed ($\omega e$), or the over-run clutch is determined to be engaged. At step 109, alternator torque is calculated and at step 110, the full alternator torque is applied to the engine. The process 100 ends after steps 110 or 112. In some embodiments, the process 100 may loop back to the beginning at step 102, and repeat the steps continuously while the engine is turned on. In some embodiments, the system (discussed below in more detail) may have a sensor to determine the alternator rotor's angular speed ($\omega a$). In some embodiments, the system may have a sensor to determine engine rotation angular speed ($\omega e$).

Figure 2:
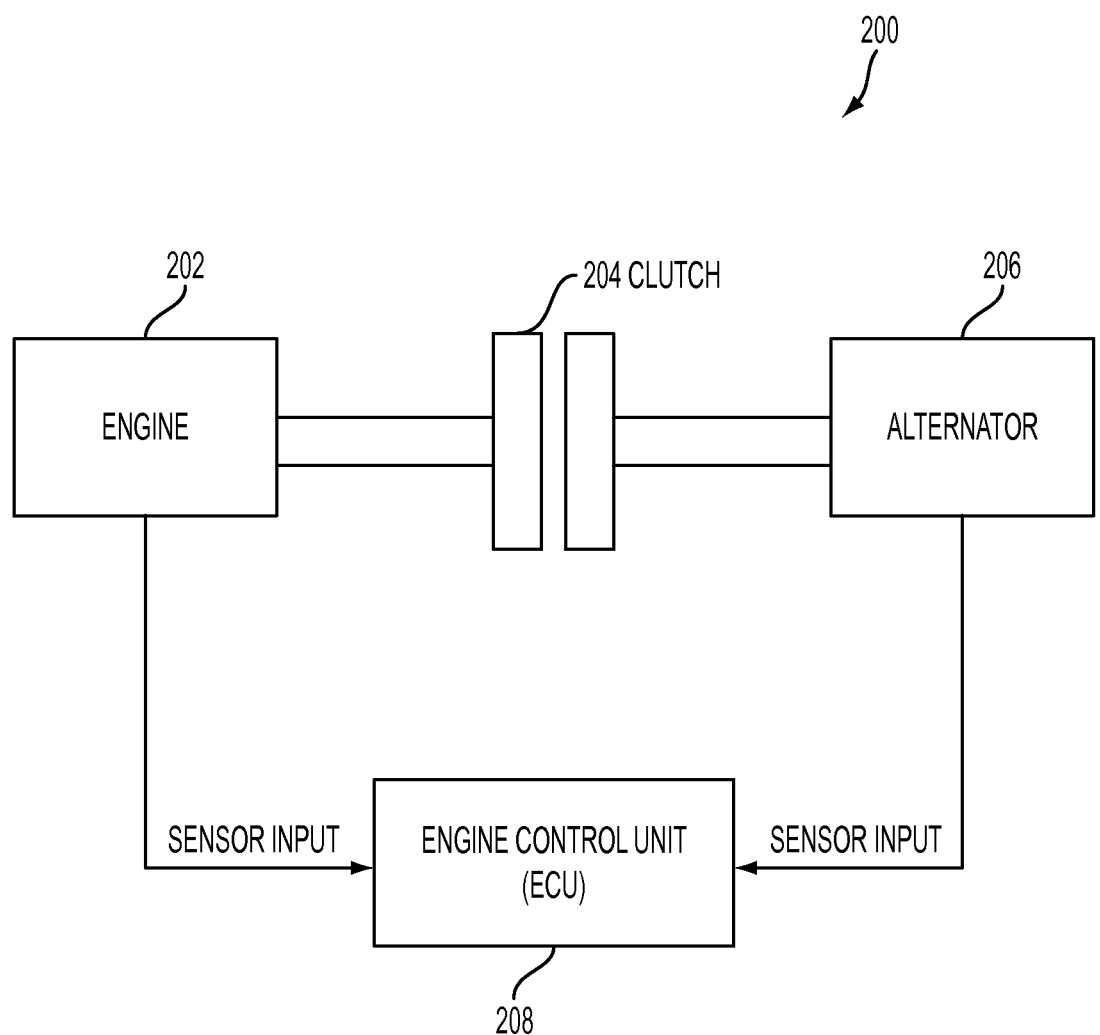
FIG. 2 illustrates a block diagram of a system disclosed herein.

FIG. 2 illustrates a block diagram of an example system 200, constructed in accordance with the present disclosure, inside a vehicle. As shown, the system 200 comprises an engine 202, clutch 204, alternator 206 and an ECU 208. The engine 202 is coupled to the over-run clutch 204. The alternator 206 is also coupled to the clutch 204. The clutch 204 may be any type of clutch, and is not limited to an over-run clutch. A sensor (not shown) may detect the engine rotation angular speed ($\omega e$) of the engine 202, which may be used by the engine control unit (208) in the calculations below. Another sensor may be used to detect the alternator rotor's angular speed ($\omega a$), which may be used by the engine control unit (208) in the calculations below.

Figure 3:
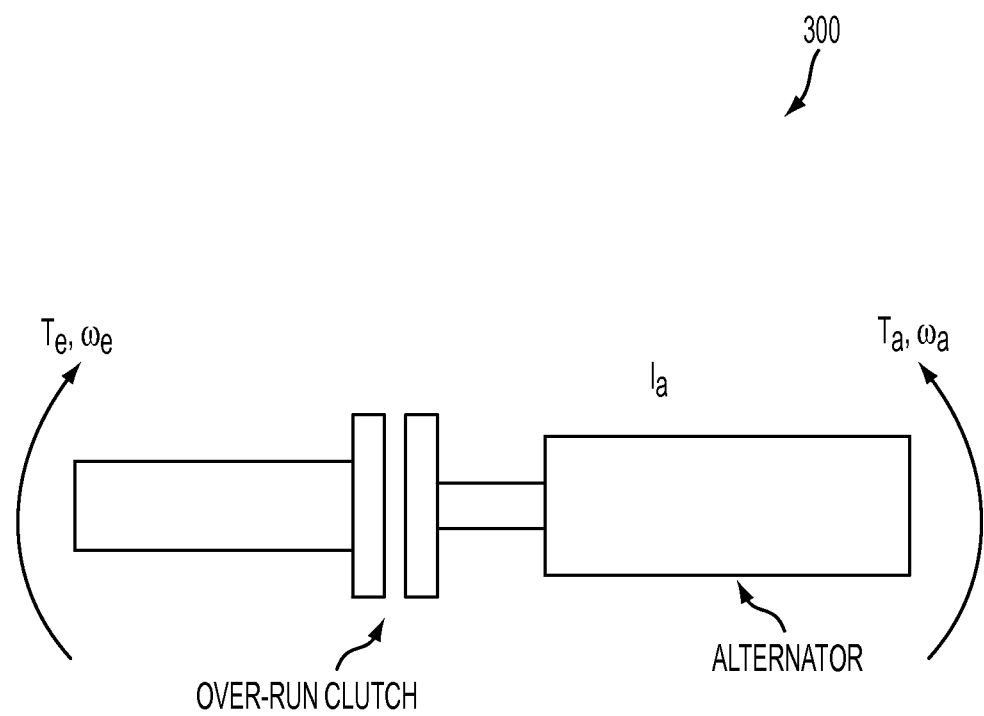
FIG. 3 illustrates a diagram of the dynamics of the FIG. 2 system.

FIG. 3 illustrates a diagram of the dynamics 300 of the system 200 illustrated in FIG. 2. Where:

Ta=alternator torque due to electrical energy generation;
Te=torque asserted by alternator through over-run clutch;
$\omega e$=engine rotation angular speed;
$\omega a$=alternator rotor's angular speed;
Ia=alternator rotational inertia;
$\dot{\omega}a$=alternator angular acceleration rate;
$\dot{\omega}e$=engine angular acceleration rate;
$\omega a\_pre$=previous alternator rotor's angular speed; and
DC=alternator control duty cycle.

With the over-run clutch, alternator load will be disengaged from the engine whenever the alternator speed is higher than engine speed ($\omega a > \omega e$). This happens when the engine decelerates quickly. Therefore, when the engine RPM decreases ($\dot{\omega}e<0$), alternator rotor speed ($\omega a$) is estimated by assuming that the over-run clutch is not driving the alternator (i.e., Te=0). The following dynamic equations follow:

$$\dot{\omega}a = -Ta/Ia \qquad (1)$$

$$Ta = f(\omega a, DC) \qquad (2)$$

The alternator control duty cycle (DC) range is typically between 0 and 100, with 0 being no current, and 100 being full current from the alternator.

$$\omega a = \omega a\_pre + \dot{\omega}a * \Delta t \qquad (3)$$

The alternator rotor speed ($\omega a$) is updated based on the previous calculation taken at a prior time (t). The change in time ($\Delta t$) between the previous calculation and the current calculation may be any time deemed suitable for the estimate. In an example embodiment, the change in time ($\Delta t$)=10 milliseconds. Example computer executable instructions to implement steps 106-109 of the process 100 illustrated in FIG. 1 can be as follows:

If $\omega a > \omega e$—if alternator speed is higher than engine speed; (4)

Te=0—no alternator torque asserted on engine; (5)

Else—alternator speed is same as engine speed OR over-run clutch engaged;

Te=$f(\omega e, DC) + Ia*\dot{\omega}e$—full alternator torque being asserted to the engine; (6)

End if.

The torque asserted by alternator through over-run clutch (Te) will be integrated as a part of engine accessory load for engine torque estimation. It is calculated in real time, or continuously, on the ECU based on the vehicle operation conditions. Real time as used herein may refer to a calculation or determination and correction is processed or completed at substantially the same rate or time as all incoming relevant data pertaining to the calculation.

Typically, the alternator torque may be in units of Newton-meters (Nm). In some embodiments, the range of alternator torque may be between 0-30 Nm. In other embodiments, the alternator torque may have other values outside of this range. The engine rotation angular speed is typically in units of radians/second. In some embodiments, the range of engine rotation angular speed may be 0-700 rad/sec. In other embodiments, the engine rotation angular speed may have other values outside of this range. In some embodiments, the alternator rotational inertia may have units of kilogram*meter*meter ($kg*m^2$).

In accordance with the practices of persons skilled in the art of computer programming, embodiments are described with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits. Embodiments may also encompass integrated circuitry including circuit elements capable of performing specific system operations.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc.

What is claimed is:

1. A system for providing, in real time, an engine torque load to an engine in a vehicle containing an over-run clutch, said system comprising:
   a first portion of the over-run clutch coupled to an alternator, and a second portion of the over-run clutch coupled to the engine;
   a sensor that determines, in real time, a clutch state of the over-run clutch coupled to an alternator wherein the clutch state comprises whether or not the over-run clutch is presently engaged; and
   a controller adapted to:
      calculate an alternator torque value; and
      apply the alternator torque value to the engine torque load in real time;
      wherein the alternator torque value is set to zero when it is determined that an alternator rotor angular speed is greater than an engine rotation angular speed.

2. The system of claim 1, wherein the controller determines that an alternator load is disengaged from the engine when the alternator rotor speed is greater than the engine rotation speed.

3. The system of claim 1, further comprising a sensor to detect the speed of the engine, wherein the clutch state of the over-run clutch coupled to the alternator is determined in real time based on the speed of the engine.

4. The system of claim 1, further comprising a sensor to detect the speed of the alternator.

5. The system of claim 1, wherein determining an amount of alternator torque further comprises:
   estimating the alternator rotor speed when the engine revolutions per minute decreases.

6. The system of claim 5, wherein the alternator rotor speed is estimated by assuming that the engine is decoupled from the alternator.

7. The system of claim 1, wherein the alternator torque value is based at least in part on an alternator inertia.

8. A method of updating an engine torque load for a vehicle, said method comprising:
   determining by a sensor a clutch state of an alternator over-run clutch, wherein a clutch state comprises whether or not the alternator over-run clutch is presently engaged, and wherein a first portion of the alternator over-run clutch coupled to an alternator, and a second portion of the alternator over-run clutch coupled to the engine;
   determining by an engine control unit an alternator torque value; and
   applying by an engine control unit the alternator torque value to the engine torque load when it is determined that the clutch state corresponds to an alternator over-run clutch engaged state;
   wherein the alternator torque value is set to zero when it is determined that an alternator rotor angular speed is greater than an engine rotation angular speed.

9. The method of claim 8, further comprising determining that an alternator load is disengaged from the engine when the alternator rotor speed is greater than the engine rotation speed.

10. The method of claim 8, wherein the clutch state of the alternator over-run clutch is determined in real time based on the speed of the engine.

11. The method of claim 8, wherein determining an amount of alternator torque comprises:
    estimating the alternator rotor speed when the engine revolutions per minute decreases.

12. The method of claim 11, wherein the alternator rotor speed is estimated by assuming that the engine is decoupled from the alternator.

13. The method of claim 8, wherein the alternator torque value is based at least in part on an alternator inertia.

14. The system of claim 2, wherein the alternator rotor's angular speed is set equal to the engine rotation angular speed if it is determined that the alternator rotor angular speed is not greater than the engine rotation angular speed.

15. The system of claim 14, wherein the clutch state of the over-run clutch coupled to the alternator is sampled at regular time intervals during operation of the vehicle.

* * * * *